United States Patent
Dixon

(10) Patent No.: US 9,825,561 B2
(45) Date of Patent: Nov. 21, 2017

(54) SYSTEM, APPARATUS, AND METHOD FOR CONTROLLING A MOTOR

(71) Applicant: SHAW DIXON, LLC, Bonita Springs, FL (US)

(72) Inventor: Randy J. Dixon, Billings, MT (US)

(73) Assignee: Shaw Dixon, LLC, Bonita Springs, FL (US)

( * ) Notice: Subject to any disclaimer, the term of this patent is extended or adjusted under 35 U.S.C. 154(b) by 0 days.

(21) Appl. No.: 15/150,420

(22) Filed: May 9, 2016

(65) Prior Publication Data

US 2016/0329843 A1    Nov. 10, 2016

Related U.S. Application Data

(63) Continuation of application No. 14/160,357, filed on Jan. 21, 2014, now Pat. No. 9,337,707.

(Continued)

(51) Int. Cl.

| | |
|---|---|
| *H02P 6/16* | (2016.01) |
| *H02P 6/00* | (2016.01) |
| *H02K 11/22* | (2016.01) |
| *H02P 6/06* | (2006.01) |
| *H02K 11/00* | (2016.01) |

(Continued)

(52) U.S. Cl.
CPC ............ *H02P 6/06* (2013.01); *H02K 5/136* (2013.01); *H02K 11/0094* (2013.01); *H02K 11/22* (2016.01); *H02K 11/28* (2016.01); *H02K 11/33* (2016.01); *H02K 11/35* (2016.01); *H02P 27/06* (2013.01); *H02K 5/12* (2013.01); *H02K 2213/09* (2013.01)

(58) Field of Classification Search
CPC .... H02K 11/33; H02K 11/35; H02K 11/0094; H02K 11/20; H02K 11/25; H02K 5/225; H02K 11/215; H02K 11/22; G07C 3/00; G01R 31/343; G01R 33/028; F24F 11/006; H02P 27/08; H02P 6/16; G05B 2219/24053

See application file for complete search history.

(56) References Cited

U.S. PATENT DOCUMENTS 5,852,351 A * 12/1998 Canada ................ G01R 31/343
                                                        318/490
5,912,541 A *  6/1999 Bigler .................. H02K 11/215
                                                        318/538

(Continued)

*Primary Examiner* — Paul Ip
(74) *Attorney, Agent, or Firm* — Hahn Loeser & Parks LLP

(57) ABSTRACT

Mechanisms are provided to control the operation of a motor. In particular, a variable frequency drive motor controller is described which resides within a motor housing. Additionally, the speed at which the motor operates is based on a signal received from a Hall Effect switch or from a communication device in communication with a remote interface. The Hall Effect switch is also described; in particular, the Hall Effect switch features a magnet rotatably connected with one side of a motor housing. A Hall Effect sensor, located on the opposite side of the motor housing, detects the position of the magnet and outputs a signal to the motor controller, located within the motor housing, indicating the detected magnet position. Additional operating features are described relating to the safe operation and control of the motor in potentially hazardous environments.

3 Claims, 9 Drawing Sheets

Related U.S. Application Data

(60) Provisional application No. 61/757,618, filed on Jan. 28, 2013.

(51) Int. Cl.
*H02K 11/28* (2016.01)
*H02K 11/35* (2016.01)
*H02K 5/136* (2006.01)
*H02K 11/33* (2016.01)
*H02P 27/06* (2006.01)
*H02K 5/12* (2006.01)

(56) References Cited

U.S. PATENT DOCUMENTS

| | | | | |
|---|---|---|---|---|
| 6,124,692 A * | 9/2000 | Canada | ............... | G01R 31/343 318/490 |
| 6,138,078 A * | 10/2000 | Canada | ............... | G01R 31/343 318/490 |
| 6,199,018 B1 * | 3/2001 | Quist | ............... | G01M 13/028 318/806 |
| 6,297,742 B1 * | 10/2001 | Canada | ............... | G01R 31/343 318/490 |
| 8,063,593 B2 * | 11/2011 | Mullin | ............... | H02K 11/33 318/400.01 |
| 8,067,911 B2 * | 11/2011 | Mullin | ............... | H02K 11/33 235/492 |
| 8,067,912 B2 * | 11/2011 | Mullin | ............... | H02K 11/33 235/492 |
| 8,242,723 B2 * | 8/2012 | Green | ............... | F24F 11/006 318/400.01 |
| 8,598,833 B2 * | 12/2013 | Jeung | ............... | H05K 9/0058 318/400.24 |
| 8,653,769 B2 * | 2/2014 | Green | ............... | F24F 11/006 318/400.01 |
| 2010/0085002 A1 * | 4/2010 | Knauff | ............... | H02K 11/35 318/490 |
| 2011/0140644 A1 * | 6/2011 | Jeung | ............... | H05K 9/0058 318/400.24 |

\* cited by examiner

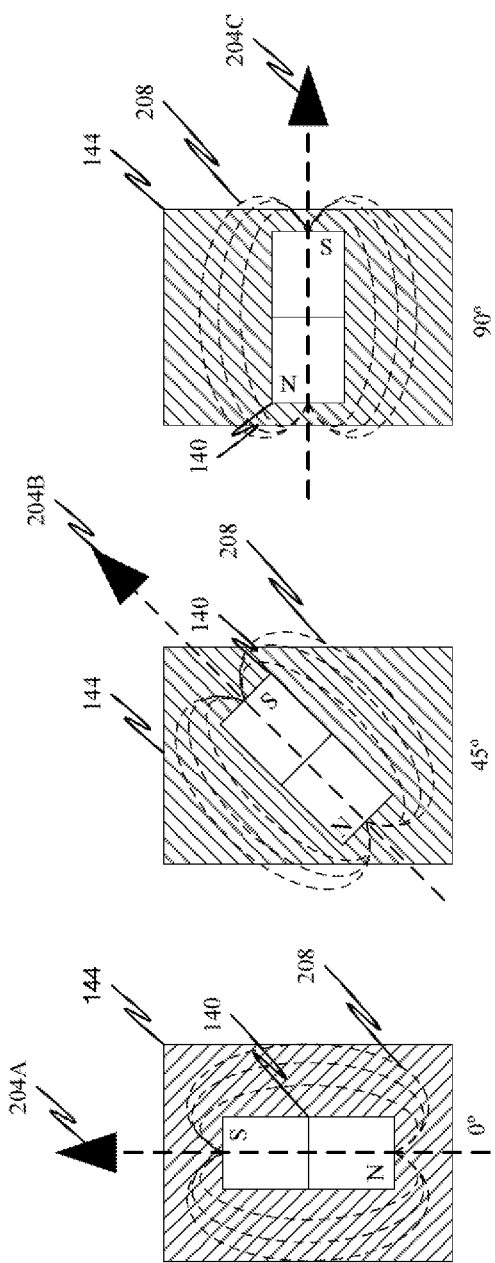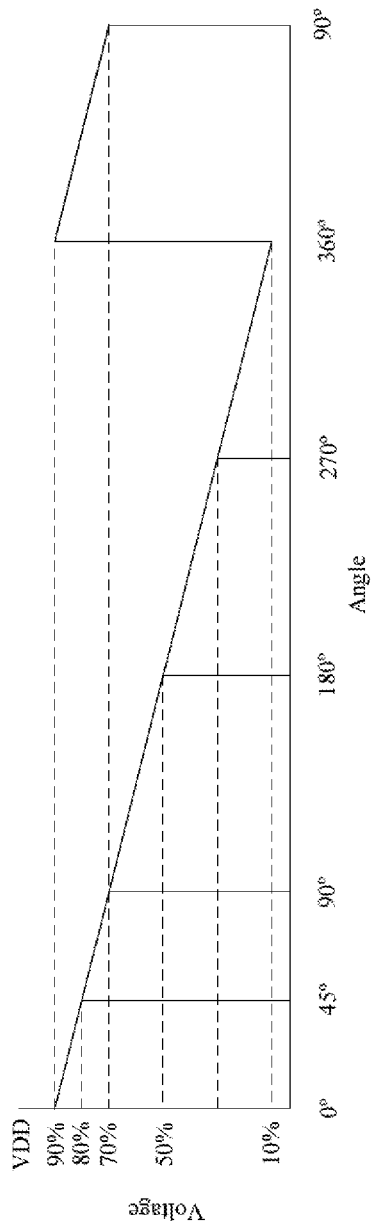
Fig. 2A  Fig. 2B  Fig. 2C  Fig. 2D

| Profile | Sensor | Min | Max |
|---|---|---|---|
| | System Operating Profile | | |
| Very High | Winding_Φ1+_Temp | - | 90 °C |
| | Housing_A_Temp | - | 70 °C |
| | Current_u1+ | 2.5 | 4.1 |
| | Voltage_u1 | 22 | 26 |
| High | Winding_Φ1+_Temp | - | 105 °C |
| | Housing__Temp | - | 82 °C |
| | ... | ... | ... |
| | Current_u1+ | 2.5 | 5 |
| Level X... | Winding_Φ1+_Temp | - | 105 °C |
| . | Housing__Temp | - | 82 °C |
| . | ... | ... | ... |
| . | Voltage_u1 | 22 | 26 |
| Very Low | Winding_Φ1+_Temp | - | 155 °C |
| | ... | ... | ... |
| | Current_u1+ | 2.5 | 7 |
| | Rate | - | 1750 |

SYSTEM, APPARATUS, AND METHOD FOR CONTROLLING A MOTOR

CROSS REFERENCE TO RELATED APPLICATION

The present application is a continuation of U.S. patent application Ser. No. 14/160,357, filed Jan. 21, 2014, now U.S. Pat. No. 9,337,707, which claims the benefits of and priority from U.S. Provisional Application Ser. No. 61/757,618, filed Jan. 28, 2013, the entire disclosures of which are hereby incorporated by reference in their entirety for all that they teach and for all purposes.

FIELD OF THE INVENTION

The present invention relates generally to a brushless direct current motor of an improved design. More specifically, a motor utilizing various features to improve performance and safety, particularly when utilized as a transfer pump in operations related to combustible materials, is disclosed.

BACKGROUND

It is known to utilize devices known as transfer pumps in the transfer, removal, and/or storage of various fluids. For example, U.S. Pat. No. 6,167,907 to Liaw, which is hereby incorporated by reference in its entirety, describes a rotary transfer pump that is connectable to a power source. Transfer pumps that are used in the transfer of flammable fluids require special attention to ensure the prevention of combustion during transfer and to ensure the safety of users and persons generally in the vicinity of the pump. These pumps may be required to meet standards set forth by organizations such as UL® and/or insurance institutions such as FM Global®. U.S. Patent Application Publication No. 2008/0251049 to Sellas et al. discloses a device for supplying fuel under high pressure by a transfer pump, and is hereby incorporated by reference in its entirety. However, these references fail to teach at least some of the novel aspects of the present invention. Therefore, there has been a long-felt and unmet need to provide a pump suitable for use in transfer operations that incorporates various safety and efficiency attributes of the present invention as described herein.

SUMMARY

The devices described above do not teach a pump that employs a Hall effect switch or a device that incorporates logic to control start-up and slow-down speeds. Additionally, the devices described above do not teach a device where the motor may be activated or deactivated through the use of a Hall effect switch. It is thus one aspect of the present invention to provide a pump with the ability to be activated and/or deactivated with the use of a switch, utilizing the Hall Effect, to obviate the need for conventional equipment associated with mechanical switches. The Hall Effect occurs when a magnetic field is applied perpendicular to the flow of a current. The applied magnetic field causes a resistance in the current and results in a weak, but measurable potential difference, or voltage, perpendicular to both the current flow and the applied magnetic field. It is thus an object of the present invention to avoid electrical wiring, apertures, and/or similar objects that necessitate a specific motor body structure or pose safety concerns by implementing a switch based on the Hall Effect.

It is yet another aspect of the present invention to provide a logic driven brushless direct current motor wherein the device is capable of "soft start" functionality and automatic speed reduction. For example, in addition to activating and deactivating the brushless direct current motor, the Hall Effect switch may be utilized to adjust a speed with which the direct current motor rotates. That is, the rotational speed of the direct current brushless motor may be based in part on the Hall Effect switch. Additionally, the "soft start" functionality may be implemented as a function of the Hall Effect switch and additional operating or feedback parameters provided to a variable frequency drive circuit or module.

It is yet another aspect of the present invention to implement various inventive aspects within a transfer pump suited for pump applications involving flammable gas and liquids.

It is yet another aspect of the present invention to provide a variable frequency drive controller that operates in accordance with various operating parameters, the variable frequency drive controller being disposed within the motor housing or enclosure. Brushless direct current motors operate at temperatures that generally exceed the rated operating conditions of most electronics; therefore, variable frequency drive controllers have been provided in an enclosure separate from that of the motor. Therefore, it is one aspect of the present invention to provide a variable frequency drive controller that functions in such a manner as to ensure that the motor operates at a temperature that is below a predetermined value. As such, the variable frequency drive controller may reside within the motor housing. Alternatively, or in addition, the variable frequency drive controller resides within the motor housing.

In accordance with at least one embodiment of the present disclosure, a description relating to a motor and control system is provided comprising: a motor housing enclosing at least a portion of a motor, a motor control circuit operable to receive at least one indication relating to the operation of the motor and control system and provide at least one drive signal to the motor based on the at least one received indication, and a Hall Effect switch comprising at least one Hall Effect sensor and at least one magnet having a North and South pole, the at least one Hall Effect sensor disposed such that at least a portion of the motor housing is sandwiched between the at least one Hall Effect sensor and the at least one magnet, wherein the at least one Hall Effect sensor provides a signal to the motor controller circuit.

It is yet another aspect of the present disclosure that a method of controlling a motor is provided, the method generally comprising: receiving at least one indication relating to an operation of at least one of the motor and a control system, receiving a signal from a Hall Effect switch, the Hall Effect switch comprising at least one Hall Effect sensor and at least one magnet having a north and south pole, wherein the at least one Hall Effect sensor detects the at least one magnet through a motor housing sandwiched between the at least one Hall Effect sensor and the at least one magnet, and providing at least one drive signal to the motor based on the at least one received indication relating to the operation of the at least one of the motor and the control system and the signal received from the Hall Effect switch.

It is yet another aspect of the present disclosure that a brushless transfer pump motor and control system is provided, the system generally comprising: a motor housing enclosing at least a portion of a direct current brushless motor, the direct current brushless motor housing having a first side and a second side, a motor control circuit operable to receive at least one indication relating to the operation of the direct current brushless motor and the control system, the motor control circuit further operable to provide at least one drive signal to the motor based on the at least one received indication, and a Hall Effect switch comprising at least one Hall Effect sensor and at least one magnet having a north and south pole, the at least one magnet rotatably connected with the motor housing, the at least one Hall Effect sensor disposed such that at least a portion of the motor housing is sandwiched between the at least one Hall Effect sensor and the at least one magnet, wherein the at least one Hall Effect sensor provides a signal to the motor controller circuit based on a rotary angle of the at least one magnet with respect to the at least one Hall Effect sensor, wherein the at least one drive signal is altered in response to the signal provided by the at least one Hall Effect sensor.

In another embodiment consistent with the present disclosure, the at least one magnet is rotatably connected to the motor housing and the signal provided by the at least one Hall Effect sensor is based on a rotary angle of the at least one magnet with respect to the at least one Hall Effect sensor.

In another embodiment consistent with the present disclosure, the at least one drive signal is altered in response to the signal provided by the at least one Hall Effect sensor.

In another embodiment consistent with the present disclosure, a speed at which the motor operates is varied in response to the signal provided by the at least one Hall Effect sensor.

In another embodiment consistent with the present disclosure, the motor is an electric direct current brushless motor.

In another embodiment consistent with the present disclosure, the motor housing comprises at least one of aluminum, copper, plastic, carbon fiber, and non-magnetic stainless steel.

In another embodiment consistent with the present disclosure, the at least one indication relating to the operation of the motor control system is one of temperature, current, voltage, and revolutions per minute (rpm).

In another embodiment consistent with the present disclosure, the at least one indication relating to the operation of the motor and control system is compared to at least one predetermined threshold, and the at least one drive signal is altered in response to the at least one indication relating to the operation of the motor and control system being greater than the at least one predetermined threshold.

In another embodiment consistent with the present disclosure, the at least one threshold is adjustable and is provided as part of a selected system operating profile comprising one or more thresholds.

In another embodiment consistent with the present disclosure, at least one system operating profile is selectable based on operating conditions in which the motor and control system are to operate within.

In another embodiment consistent with the present disclosure, the motor control circuit is a variable frequency drive controller, the motor housing is cylindrical, and the variable frequency drive controller is located within the cylindrical housing.

It is yet another aspect of the present disclosure that a motor and control system is provided, the system generally comprising: a motor housing enclosing at least a portion of a motor, and a motor control circuit disposed within the motor housing.

In another embodiment consistent with the present disclosure, the motor control circuit comprises a variable frequency drive controller.

In another embodiment consistent with the present disclosure, the motor and control circuit provides at least one drive signal to the motor based on at least one received indication relating to the operation of the motor and the control system.

In another embodiment consistent with the present disclosure, the at least one indication relating to the operation of the motor and the control system is one of temperature, current, voltage, and revolutions per minute (rpm).

In another embodiment consistent with the present disclosure, the indication relating to the operation of the motor and the control system is compared to at least one predetermined threshold; and wherein the at least one drive signal is altered in response to the indication relating to the operation of the motor and the control system being greater than the at least one predetermined threshold.

In another embodiment consistent with the present disclosure, the at least one threshold is adjustable and the at least one threshold is provided as part of a selected system operating profile comprising one or more thresholds, the at least one system operating profile being selectable.

In another embodiment consistent with the present disclosure, the motor housing comprises at least one of aluminum, copper, plastic, carbon fiber, and non-magnetic stainless steel.

It is yet another aspect of the present disclosure that a motor and control system is provided, the system generally comprising: a motor housing enclosing at least a portion of a motor, a motor control circuit operable to receive at least one operating parameter relating to the operation of the motor and control system and provide at least one drive signal to the motor based on the at least one received operating parameter, wherein the motor control circuit is a variable frequency drive controller and the variable frequency drive controller is located within the housing.

In another embodiment consistent with the present disclosure, the motor is an electric direct current brushless motor.

In another embodiment consistent with the present disclosure, the motor housing comprises at least one of aluminum, copper, plastic, carbon fiber, and non-magnetic stainless steel.

In another embodiment consistent with the present disclosure, the at least one operating parameter relating to the operation of the motor control system is one of temperature, current, voltage, and revolutions per minute (rpm).

In another embodiment consistent with the present disclosure, the at least one operating parameter relating to the operation of the motor and control system is compared to at least one predetermined threshold, and wherein the at least one drive signal is altered in response to the at least one operating parameter relating to the operation of the motor and control system being greater than the at least one predetermined threshold.

In another embodiment consistent with the present disclosure, the at least one threshold is adjustable and is provided as part of a selected system operating profile comprising one or more thresholds.

In another embodiment consistent with the present disclosure, the embodiment further comprises a communication device in communication with the motor control circuit, wherein the motor control circuit receives the at least one operating parameter from the communication device.

In another embodiment consistent with the present disclosure, the embodiment further comprises a server in communication with the motor control circuit, wherein the motor control circuit receives the at least one operating parameter from the server.

In another embodiment consistent with the present disclosure, the housing is cylindrical and the variable frequency drive controller resides within the cylindrical housing.

In another embodiment consistent with the present disclosure, the housing is formed from a single piece of material.

In another embodiment consistent with the present disclosure, the motor and control system comprises an explosion-proof motor.

In another embodiment consistent with the present disclosure, the motor and control system comprises a non-explosion-proof motor.

It is yet another aspect of the present disclosure that a method of controlling a motor is provided, the method generally comprising: providing a motor housing, the motor housing enclosing at least a portion of a motor, providing a motor control circuit operable to receive at least one operating parameter relating to the operation of the motor, the motor control circuit further operable to provide at least one drive signal to the motor based on the at least one received operating parameter, wherein the motor control circuit is a variable frequency drive controller and the variable frequency drive controller is located within the housing.

In another embodiment consistent with the present disclosure, the motor is an electric direct current brushless motor and the motor housing comprises at least one of aluminum, copper, plastic, carbon fiber, and non-magnetic stainless steel.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "Hall Effect" refers to a weak, but measurable potential difference, or voltage, perpendicular to both a current flow and an applied magnetic field. Electrical currents are affected by magnetic fields. When a magnetic field is applied perpendicular to the flow of current, the field causes resistance in the current. This is a manifestation of the Lorentz force, which pushes the negatively charged electrons in the current in a direction dictated by the left hand rule. This movement of electrons results in a weak but measurable potential difference, or voltage, perpendicular both to the current flow and the applied magnetic field. This is known as the Hall effect, named after American physicist Edwin Hall, who discovered the phenomenon in 1879.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
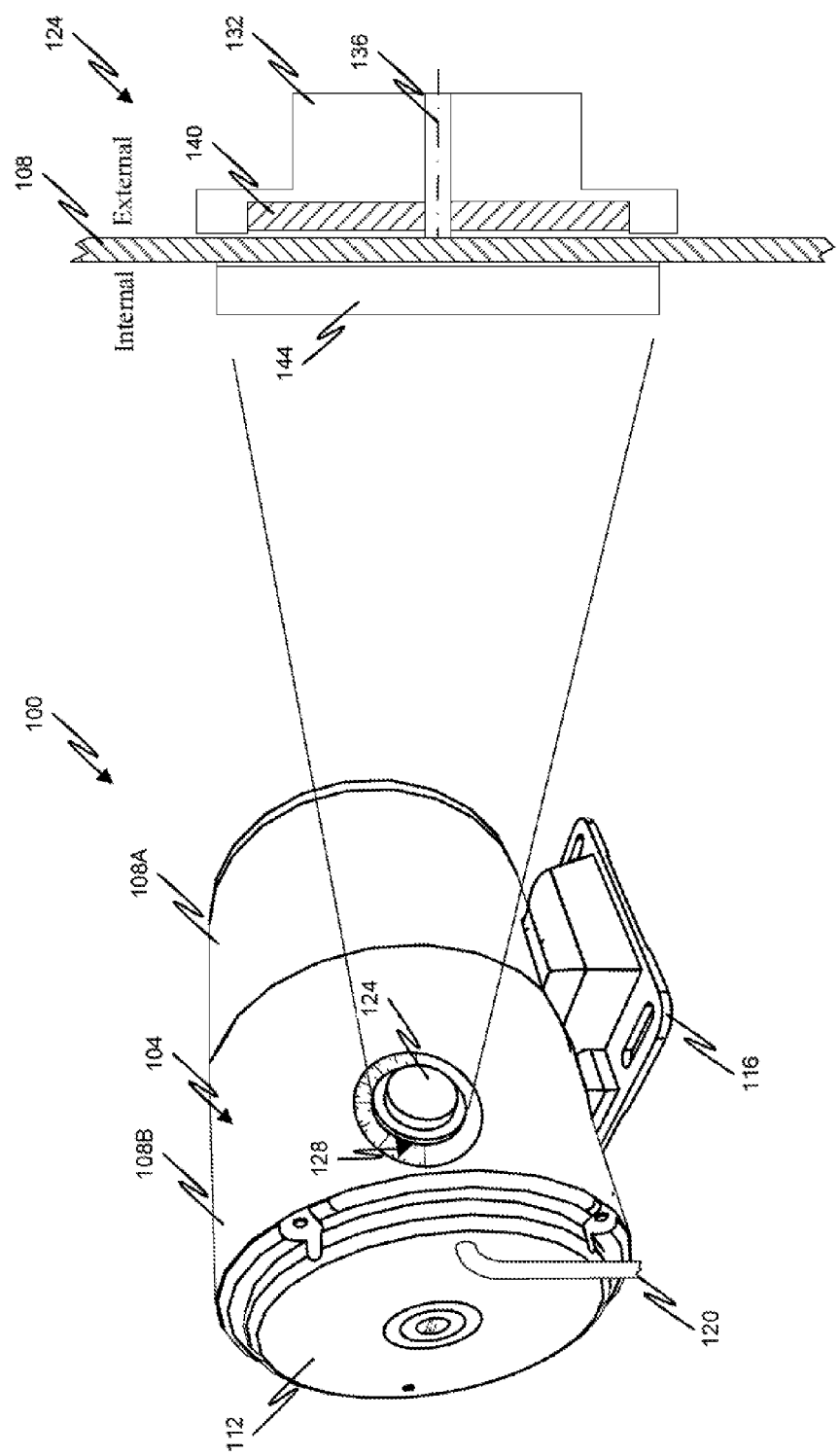
Figure 3:
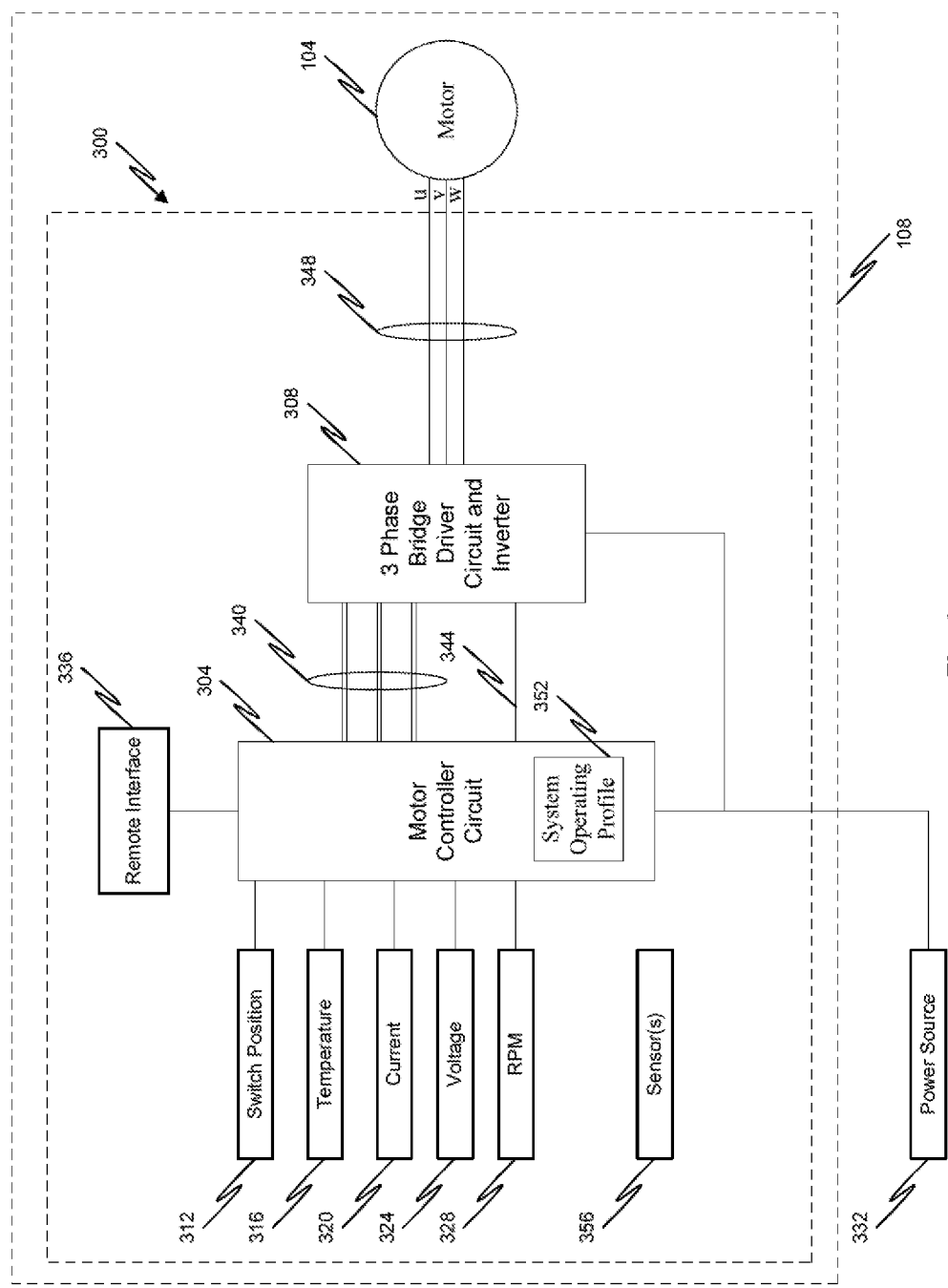
Figure 4:
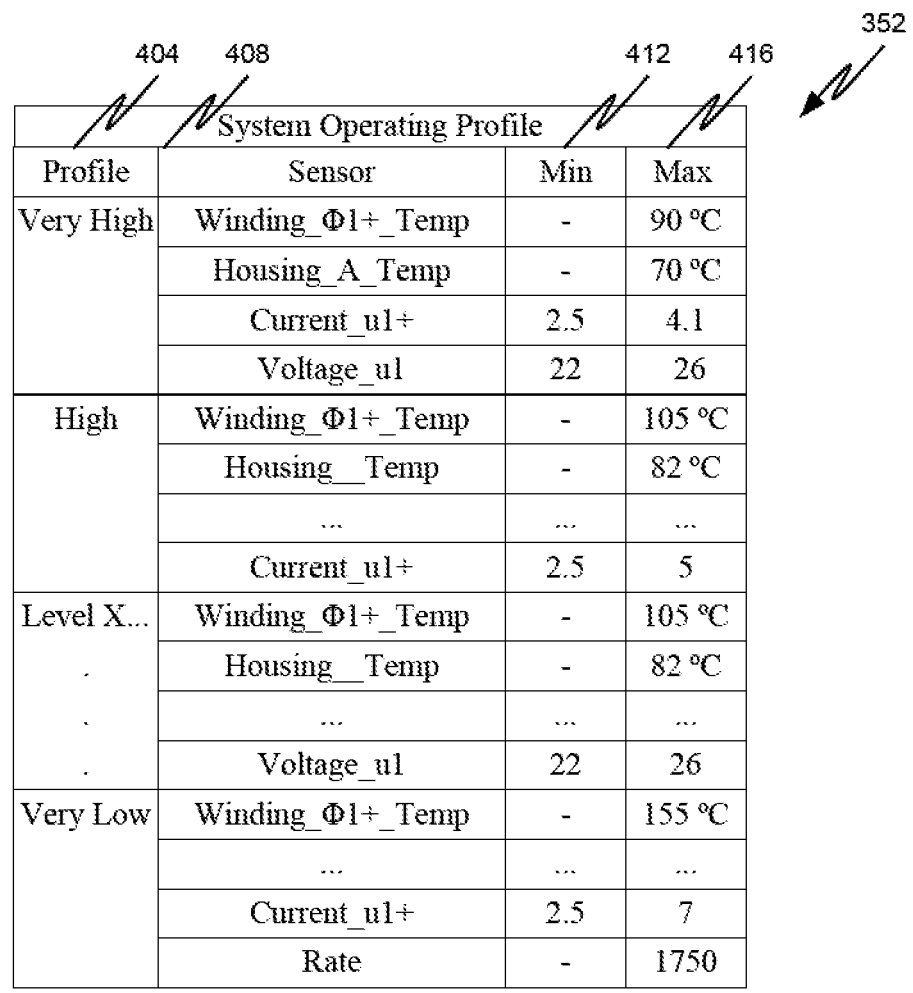
Figure 5:
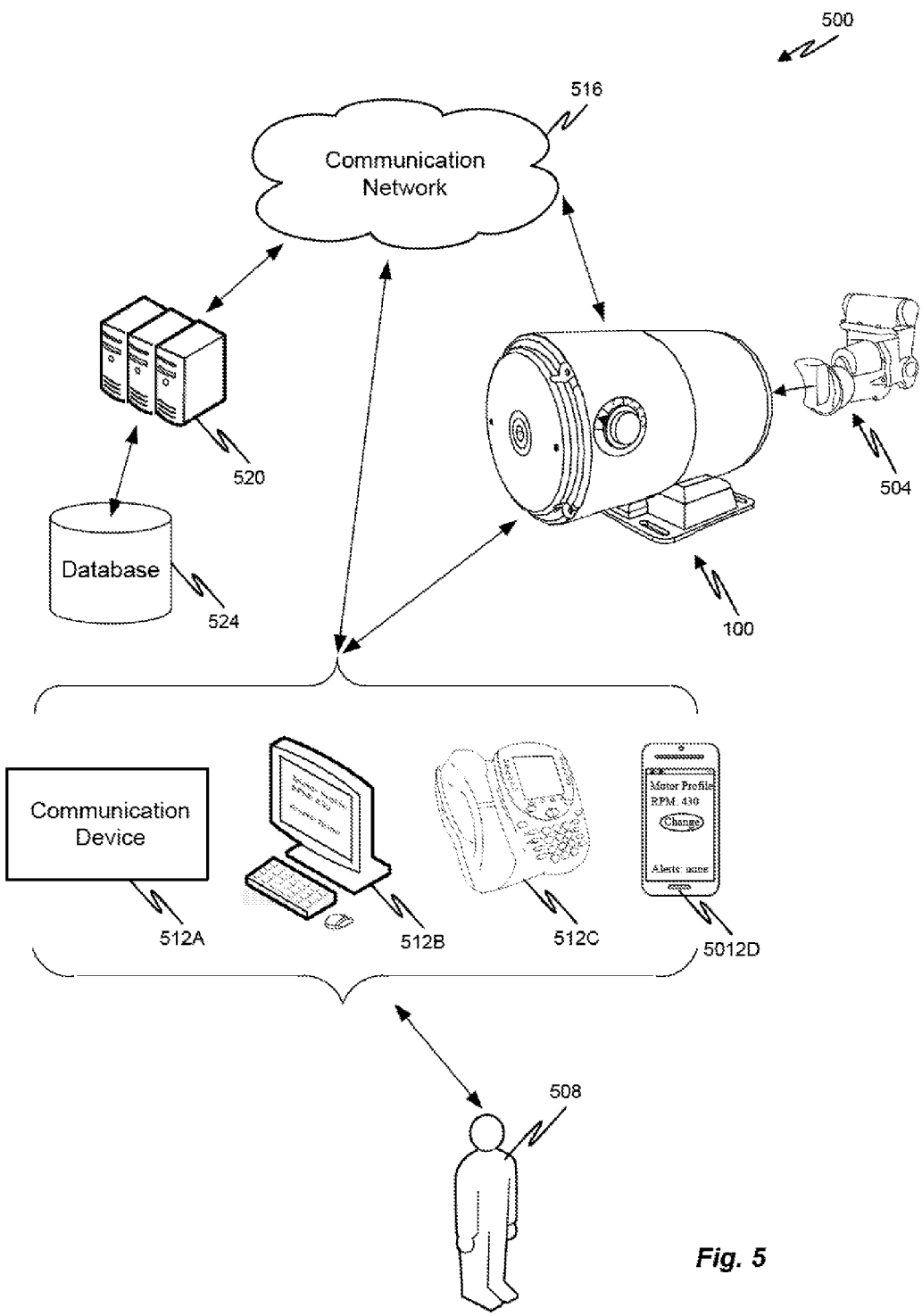
Figure 6:
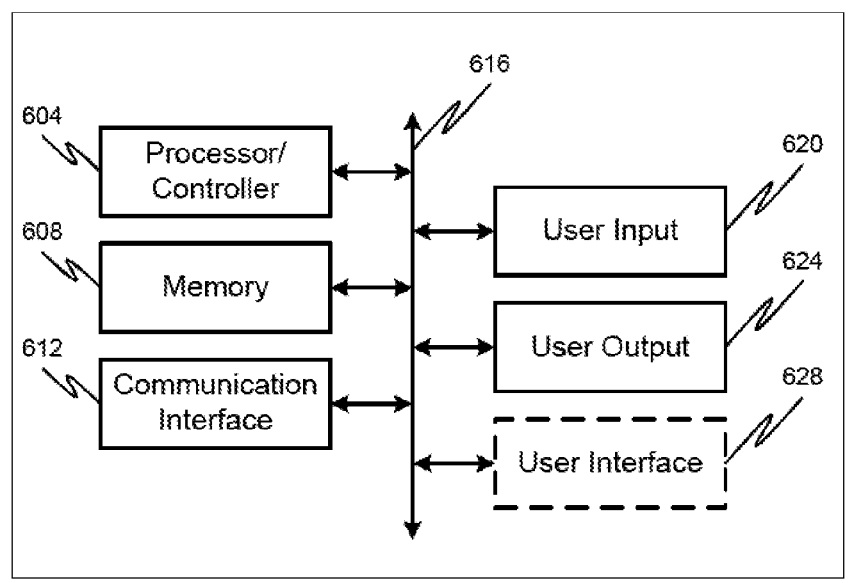
Figure 7:
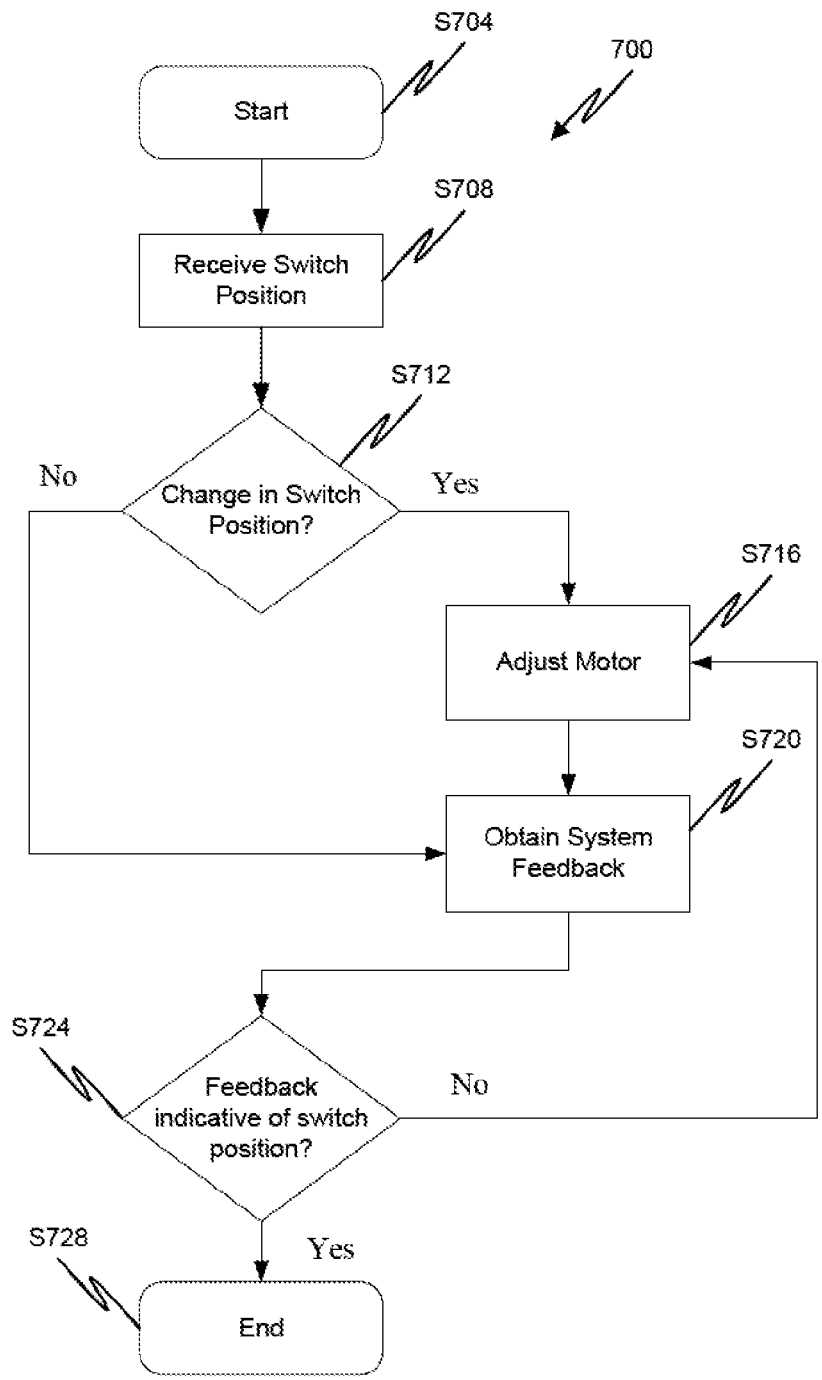
Figure 8:
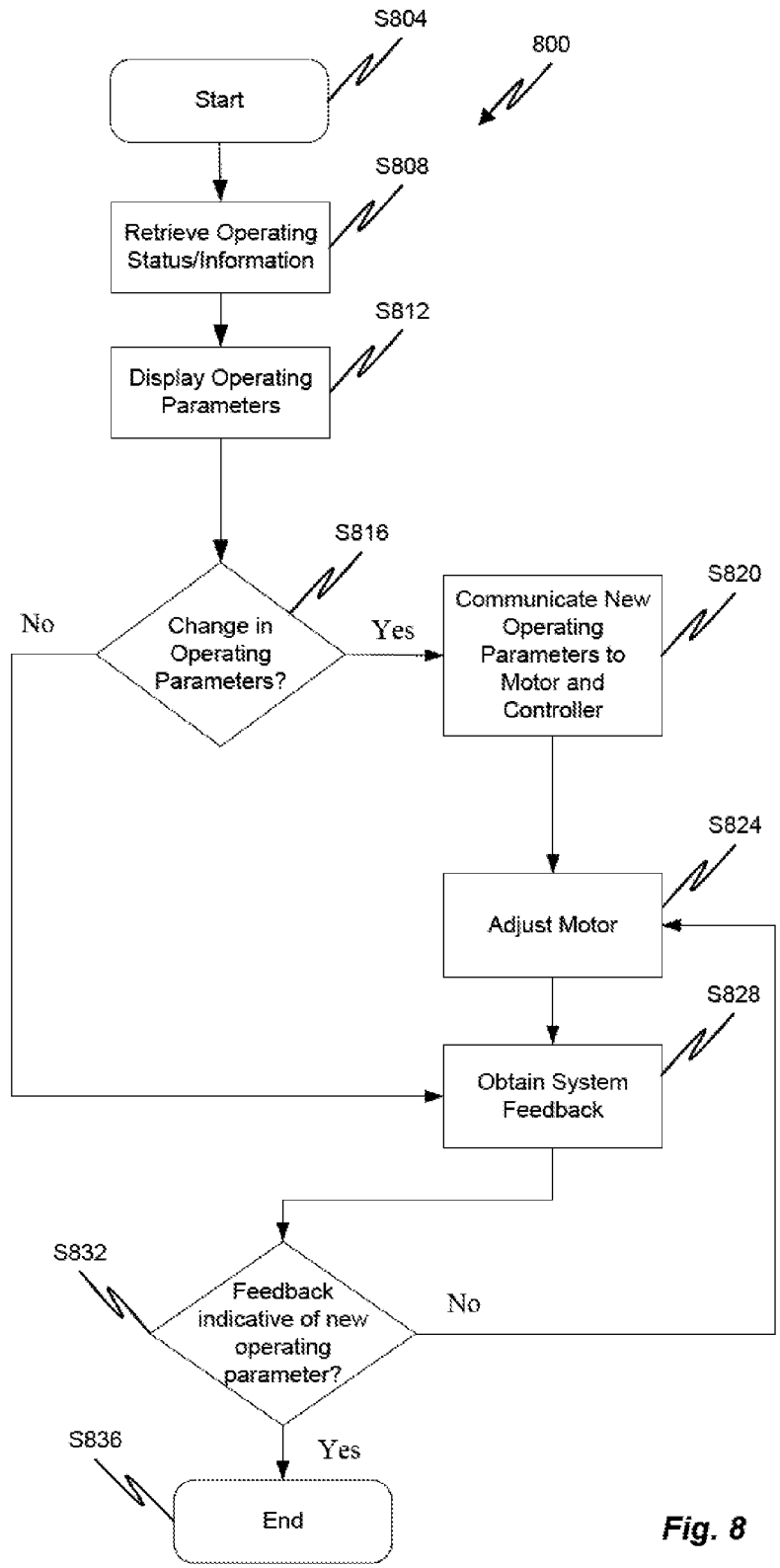
Figure 9:
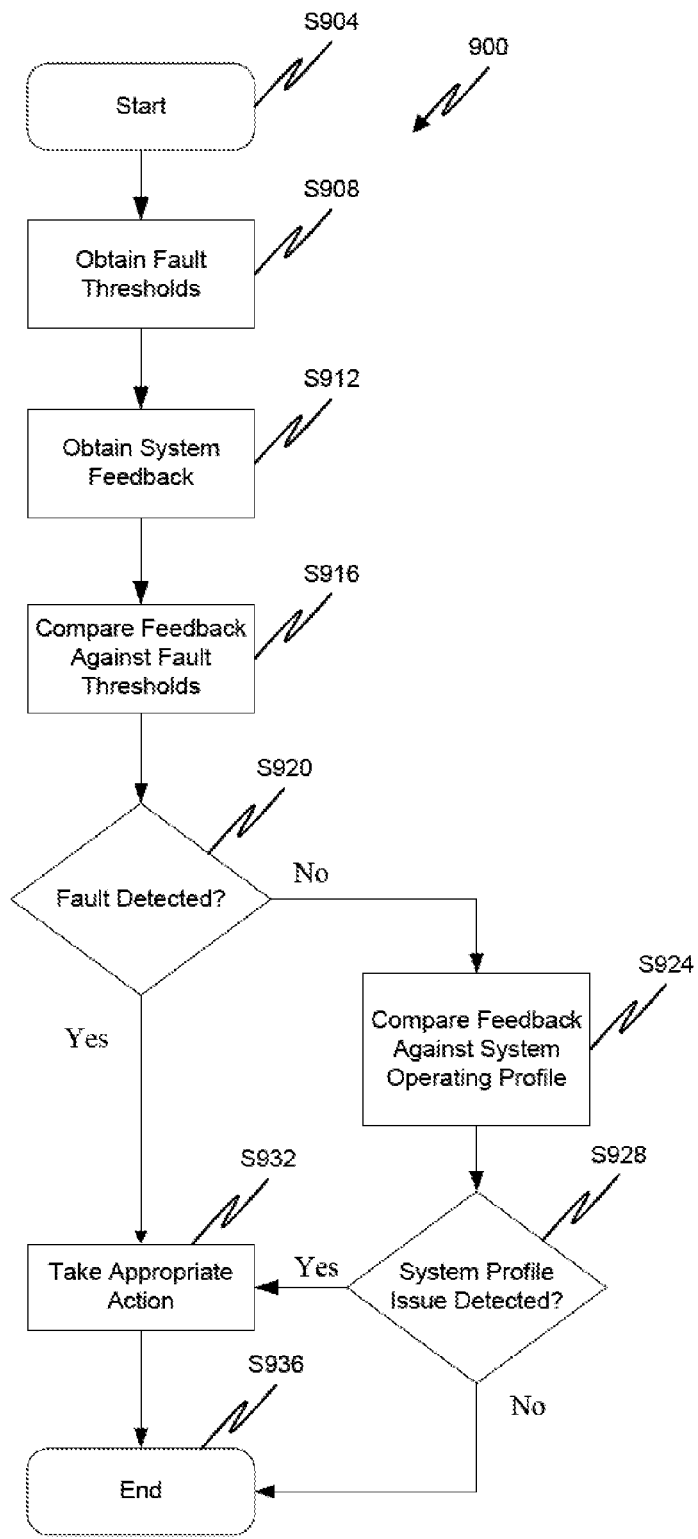

FIG. 1 depicts a first motor and control system including a cross-sectional view of a Hall Effect switch in accordance with embodiments of the present invention;

FIGS. 2A-2D depict the operation of a Hall Effect switch in accordance with embodiments of the present invention;

FIG. 3 is a block diagram depicting details of a variable frequency drive control system in accordance with embodiments of the present invention;

FIG. 4 is a diagram of a system operating profile in accordance with embodiments of the present invention;

FIG. 5 is a block diagram depicting details of a motor-pump-communication system in accordance with embodiments of the present invention;

FIG. 6 is block diagram depicting details of a one or more devices in accordance with embodiments of the present invention;

FIG. 7 is a flow diagram depicting operating details of a motor and control system in accordance with embodiments of the present invention;

FIG. 8 is a flow diagram depicting operating details of a motor and control system in accordance with embodiments of the present invention; and FIG. 9 is a flow diagram depicting operating details of a motor and control system in accordance with embodiments of the present invention.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Referring initially to FIG. 1, a rear perspective view of a first motor and control system 100 including a cross-sectional view of a Hall Effect switch 124 as depicted in accordance with at least some embodiments of the present disclosure. A motor and control system 100 may comprise a direct current (dc) brushless motor 104 and a Hall Effect switch 124. It is to be understood that although the dc brushless motor 104 is described as operating in conjunction with the Hall Effect switch 124, in some embodiments, and consistent with the present disclosure, any electric motor may be used and operated in conjunction with the Hall Effect switch 124. The motor and control system 100 further includes a motor housing/enclosure 108 comprising a front housing 108A and a rear housing 108B; the motor housing 108 encompasses internal components of the dc brushless motor 104. Although the motor housing 108 is shown as two separate components, namely 108A and 108B, a single motor housing 108 comprising both the front housing 108A and the rear housing 108B may be desirable in some embodiments. The housing 108A and 108B may be constructed from aluminum, copper, plastic, engineered resin, carbon fiber, non-magnetic stainless steel or any other material having similar properties. Alternatively, or in addition, the housing 108 may be constructed from a single material that is molded, extruded, shaped, or otherwise formed into a cylindrical shape. The motor and control system 100 may further include a rear cover 112, a front cover (not shown), and a motor mount 116. Alternatively, or in addition, the housing 108, the rear cover 112, and/or the front cover may be constructed from a single material that is molded, extruded, shaped, or otherwise formed into a cylindrical shape. Specific details regarding the construction and makeup of the dc brushless motor 104 have been omitted for sake of clarity and readability; however, internal components housed within the motor housing 108A and 108B may include but are not limited to a rotor, stator, permanent magnets, and/or coils or windings. Further, a motor 104 may be sized accordingly. For example, motor 104 may provide ⅛ horsepower, ¼ horsepower, ½ horsepower, ¾ horsepower, 1 horsepower, 1.5 horsepower, 2.5 horsepower and 5 horsepower. Alternatively, or in addition, the motor 104 may provide anywhere from 1/16 to 500 horsepower, although motor sizes capable of providing more or less horsepower is contemplated.

The motor and control system 100 may include a terminal box or terminal housing (not shown). The terminal housing may be constructed from aluminum, copper, plastic, carbon fiber, non-magnetic stainless steel or any other material having similar properties. The location and placement of the terminal housing may vary by application. For example, in some embodiments and consistent with the present disclosure, the terminal housing may be located on top of a motor housing 108 or appended to a rear cover 112. Alternatively, or in addition, the terminal housing may be fully integrated into a housing 108 or a rear cover 112 such that the terminal housing is constructed as part of the housing 108 and/or the rear cover 112. The terminal housing may have one or more apertures that allow power distribution wires 120 to enter the terminal box. In some embodiments, such as in an explosion-proof housing, where it is desirable to limit the number of openings to reduce the chances of any sparks originating from within the housing from igniting vapors, gases, dust, or fibers in the air surrounding it, a single aperture may allow a single set of power distribution wires 120 to enter the terminal housing.

Alternatively, or in addition, and as shown in FIG. 1, the motor and control system 100 may not require a terminal box and/or terminal housing. Instead, the motor housing/enclosure 108 may have one or more apertures that allow power distribution wires 120 to enter the housing 108 to power a variable frequency drive (VFD) controller located within the housing 108. In some embodiments, such as in an explosion-proof housing, where it is desirable to limit the number of openings to reduce the chances of any sparks originating from within the housing from igniting vapors, gases, dust, or fibers in the air surrounding it, a single aperture may allow a single set of power distribution wires 120 to enter the motor housing/enclosure.

As further illustrated in FIG. 1, the motor and control system 100 may include a Hall Effect switch 124 and an indicator 128. As will be described below, the Hall Effect switch 124 may be utilized to control a speed at which a dc brushless motor 104 operates. In some embodiments, the Hall Effect switch 124 and/or the motor housing 108 may include an indicator 128. The indicator 128 may provide an indication to a user operating a motor and control system 100 as to the speed, for example in revolutions per minute (RPM), at which a dc brushless motor 104 is to operate. That is, the Hall Effect switch 124 is a user operable element that allows a user to provide an operating parameter, namely speed or rate of rotation, to the motor and control system 100. The operating parameter provided by the Hall Effect switch 124 may also include a direction, and/or a variable speed associated with the direction, in which the motor 104 is to operate, for example, forward or reverse. Alternatively, or in addition, the motor and control system 100 may be paired or connected with a corresponding fluid transfer pump 504 such that the indicator 128 allows a user to set a desired rate of flow, for example in gallons per minute (gpm), of a liquid being transferred by the transfer pump. Generally speaking, the indicator 128 may be used by a user to set a desired operating speed of motor and control system 100 or an associated and connected transfer pump. Alternatively, or in addition, the Hall Effect switch 124 may simply control whether the motor 104 turns on and off, with the speed and direction of motor 104 having been preset.

A cross-sectional view of the Hall Effect switch 124 is further depicted in FIG. 1. The Hall Effect switch 124 may comprise a Hall Effect sensor 144, a magnet 140 connected with a user operable element, such as a dial 132, and an axis or shaft 136 in which the dial 132 and/or magnet 140 rotates about. The Hall Effect switch 124 and the magnet 140 may be separated by any portion of a housing pertaining to the motor and control system 100. That is, the Hall Effect switch 124 is positioned on one side of a motor housing 108, and/or a rear cover 112, while the magnet 140 is positioned on the other side of the motor housing 108 and/or the rear cover 112. Generally, the magnet 140 is positioned external to the motor housing 108 and/or the rear cover 112, while the Hall Effect sensor 144 resides within the motor housing 108 and/or the rear cover 112. The magnet 140 may be any magnetic material having a North and South pole. In some embodiments consistent with the present disclosure, the magnet 140 is a Neodymium magnet (NdFeB) having an N35M grade.

As one of ordinary skill in the art can appreciate, a dial 132 may be connected with the motor housing/enclosure 108 or in connection with the motor housing/enclosure 108 in a variety of manners. For example, and as shown in FIG. 1, the dial 132 may be connected with a shaft 136, while the shaft 136 may be connected to the motor housing/enclosure 108. The shaft 136 may be a stud, post, or protruding member connected with the motor housing/enclosure 108. Alternatively, or in addition, the dial 132 may be directly connected to a motor housing/enclosure 108 while a magnet 140 rotates about an axis or shaft 136. The magnet 140 may be connected with the dial 132 such that as the dial 132 rotates about an axis or shaft 136, the magnet 140 also rotates about an axis or shaft 136; the magnet 140 and the dial 132 may be objects that share a common or the same axis 136.

In an embodiment consistent with the present disclosure, a dial 132 may be connected with Hall Effect sensor 144 such that as the dial 132 rotates about an axis or shaft 136, the Hall effect sensor 144 rotates about an axis or shaft 136 while the magnet 144 remains stationary. In such an embodiment, the dial 132 and the Hall Effect sensor 144 may be objects that share a common or same axis 136.

The operation of the Hall Effect switch 124 will now be described with reference to FIGS. 2A-2D. In general, the Hall Effect switch 124 provides an indication of a position, or rotary angle, of a magnet 140 with respect to a Hall Effect sensor 144. The rotary angle of the magnet 140 with respect to the Hall Effect sensor 144 is detected by the Hall Effect sensor 144; that is, the Hall Effect sensor 144 provides a voltage signal corresponding to the detected rotary angle. The voltage signal may then be used as an input to a motor control system as an indication of a desired operating parameter such as speed, rpm, or flow rate. It is important to note that the Hall Effect sensor 144 and the magnet 140 may reside on opposing sides of a barrier or material, such as a motor housing/enclosure 108 and 112. For example, the Hall Effect sensor 144 may reside inside a motor housing/enclosure 108 while the magnet 140 resides external to the motor housing/enclosure 108. In one embodiment, as a magnet 140 rotates about a center axis, such as an axis or shaft 136, the Hall Effect sensor 144 detects a change in the strength and/or rotary angle of a magnetic field 208 emanating from the magnet 140. In response to the detected rotary angle, the Hall Effect sensor 140 provides an output voltage signal corresponding to the angular position, or rotary angle, of the magnet in relation to the Hall Effect sensor 140.

FIG. 2D depicts an output voltage as a function of a detected magnetic rotary angle. As the magnet 140 rotates around a central axis, such as an axis 136, the Hall Effect sensor 144 outputs a voltage signal corresponding to the detected magnetic rotary angle. The voltage signal output from the Hall Effect sensor 144 may range between a low and a high voltage value and may comprise a percentage of a voltage range. As shown in FIG. 2D, an output voltage signal corresponding to the detected magnetic rotary angle is provided as a percentage of a high voltage VDD as illustrated.

For example, a magnet 140 having North and South poles positioned as shown in FIG. 2A, may correspond to a zero degree position 204A. Such a zero degree position 204A may correspond to a user operable element, such as a dial 132, being positioned by a user in such a manner as to turn a motor 104 off. As shown in FIG. 2D, in response to a detected zero degree position 204A, the Hall Effect sensor 144 may provide an output voltage signal corresponding to ninety percent of the voltage high value, VDD.

As another example, a magnet 140 having North and South poles positioned as shown in FIG. 2B, may correspond to a forty-five degree position 204B. Such a forty-five degree position 204B may correspond to a user operable element, such as a dial 132, being set by a user such that a motor 104 is to operate at a desired speed and/or rate. As shown in FIG. 2D, in response to a detected forty-five degree position 204B, the Hall Effect sensor 144 may provide an output voltage signal corresponding to eighty percent of the voltage high value, VDD.

As another example, a magnet 140 having North and South poles positioned as shown in FIG. 2C, may correspond to a ninety degree position 204C. Such a ninety degree position 204C may correspond to a user operable element, such as a dial 132, being set by a user such that a motor 104 is to operate at a desired speed and/or rate that is greater than or less than the speed or rate of the forty-five degree position 204B. As shown in FIG. 2D, in response to a detected ninety degree position 204C, the Hall Effect sensor 144 may provide an output voltage signal corresponding to seventy percent of the voltage high value, VDD.

In some embodiments, and consistent with the present disclosure, an output voltage signal provided by the Hall Effect sensor 144 may correspond to a magnet rotary angle that is different than shown in FIG. 2D. In some embodiments, the output voltage signal values obtained from varying magnet rotary angles may be recorded and stored. Such values may be obtained during a Hall Effect switch 124 calibration procedure. For example, a value of each output voltage signal corresponding to a specific magnet rotary angle may be stored in a lookup table for use in setting or adjusting a desirable operating condition or parameter of a motor and control system 100. Alternatively, or in addition, other communication means may be utilized to convey the rotary angle as detected by the Hall Effect sensor 144 to a motor and control system 100.

Referring now to FIG. 3, details of a variable frequency drive control system 300 are depicted in accordance with at least some embodiments of the present disclosure. A variable frequency drive control system 300 may comprise a motor controller circuit 304, and may further comprise a three-phase bridge driver circuit 308, an inverter circuit 348, a remote interface 336, and/or a variety of inputs 312, 316, 320, 324, and 328. The variable frequency drive control system 300 may reside within a motor housing/enclosure 108 such that all circuits, modules, controllers, and or components remain unexposed to the external operating environment. In some embodiments, the motor controller circuit 304 may be any motor control circuit operable to provide the necessary control and drive signals to a three-phase bridge driver circuit, such as a three-phase bridge driver circuit 308. In some embodiments, and consistent with the present disclosure, the motor controller circuit 304 may be implemented using a single chip solution, such as an International Rectifier IRMCF341 integrated circuit device. The motor controller circuit 304 may further be operable to receive a switch position 312 indication; the switch position 312 indication may be provided by the output voltage signal as previously described with respect to the Hall Effect sensor 144 of the Hall Effect switch 124.

The motor controller circuit 304 may utilize a power source 332. The power source 332 may generally be, but not limited to, a single phase and/or multiple phase power source. Additionally, the power source 332 may supply A/C power having voltages between 110 and 565 volts, though the voltages may be greater than or less than 110 and 565 volts. Alternatively, or in addition, the power source 332 may supply DC power have voltages between 5 and 900 volts, though the voltages may be greater than or less than 5 and 900 volts.

The motor controller circuit 304 may be operable to receive and process feedback information related to the operation of the motor and control system 100. Such feedback information may comprise one or more readings from one or more sensors 356 corresponding to temperature 316, current 320, voltage 324, and a speed, rate, or rpm 328, and may further be utilized to operate a motor 104 in a safe manner within a specific operating environment. For example, in an operating environment where all sources of ignition are to be minimized to prevent an ignition of vapors, gases, dust, or fibers, the temperature 316, current 320, voltage 324, and speed, rate, or rpm 328 may be utilized and compared to known or predetermined thresholds to determine if the motor 104 and/or the motor and control system 100 is operating in a safe manner. In other embodiments, the readings corresponding to temperature 316, current 320, voltage 324, and speed, rate, or rpm 328 may be utilized and compared to known or predetermined thresholds to determine if the motor and control system 100 is operating in an efficient and effective manner and to further provide an indication of any error conditions, such as faults.

In some embodiments and consistent with the present disclosure, the known or predetermined thresholds may be adjustable and may depend on a specific operating environment. For example, the motor and control system 100 may be operating in an environment containing combustible concentrations of chemicals having low flash points. In environments such as these, the operation of components within the motor and control system 100 may be hazardous to operate at normal operating speeds and at normal operating temperatures. For instance, an open flame or spark may not be required to ignite the combustible concentrations of chemicals in the operating environment; a hot surface, for example if a motor housing 108 was hot, may be enough to provide a source of ignition. In environments containing combustible concentrations of chemicals having low flash points, the known or predetermined thresholds may be adjusted to ensure that the operation of the motor and control system 100 does not present an additional hazard upon operation. In some embodiments, the known or predetermined thresholds may be set according to a system operating profile 352.

A system operating profile 352 may include settings, set points, and/or thresholds for temperature, current, speed, voltage, and efficiency. Thus, a system operating profile may be implemented or selected based on operating conditions and operating environments. For example, when operating in an environment containing combustible concentrations of chemicals having a low flashpoint, a selected system operating profile may provide predetermined set points or thresholds for readings from sensors and/or indicators in the motor and control system 100. When a particular system operating profile is selected, temperature thresholds, current thresholds, voltage thresholds, and efficiency thresholds may be automatically set. Thus, when real-time feedback obtained from one or more of the temperature sensors, current sensors, voltage sensors, and speed, rate, or rpm sensors relating to the operation of the motor and control system 100 are received by the motor controller circuit 304, the predetermined thresholds according to a selected operating profile are used for comparison purposes.

In one example, the known or predetermined threshold for a temperature may be reduced according to a system operating profile 352 in order to ensure that the temperature of the motor housing 108 remains under a predetermined or specific temperature. In operating environments containing combustible concentrations of gases having higher flashpoints, the known or predetermined thresholds may be increased or adjusted according to the system operating profile; such an increase in the thresholds may allow the motor 104 to operate at a higher speed and in a more efficient and effective manner. A similar adjustment to known or predetermined thresholds for current, speed, and voltage may be made as described above.

Referring to FIG. 4, details of a system operating profile 352 are depicted in accordance with at least some embodiments of the present disclosure. A system operating profile 352 may include a profile setting 404 indicative of the operating environment or the operating conditions the motor and control system 100 is to operate in. For example, a profile 404 may be a level associate with a flashpoint of a chemical or gas and may indicate a hazard level, such as very high, high, high-medium, medium, etc. The system operating profile 352 may also provide set points or thresholds 412, 416 associate with various sensors 408 that provide the motor and control system 100 with operational feedback. For example, a sensor 408 may be Housing_A_Temp corresponding to a temperature sensor located at a specific location on a motor housing 108. Thresholds for Housing_A_Temp may be set to a minimum 412 operating temperature and a maximum 416 operating temperature according to a profile or a profile level 404. In some embodiments, and as illustrated in FIG. 4, some thresholds or set points may have no value associated therewith. Although the System Operating Profile 352 depicts certain profile levels 404, sensors 408, and thresholds 412,416, as one skilled in the art can appreciate, there may be many additional profile levels containing many additional sensors 408 having differing set points or thresholds 412, 416.

The temperature 316 may correspond to any temperature within the motor and control system 100. For example, one or more temperature sensors placed at various locations in and around the motor and control system 100 may be provided or transmitted to the motor controller circuit 304. One or more of the sensors 356 may be a temperature sensor. Temperature sensors may include RTDs, thermocouples, optical temperature readings, and the like and may further be provided to the motor controller circuit 304 directly from components within a variable frequency drive control system 300. For example, a three-phase bridge driver circuit 308 may provide an indication of a temperature to the motor controller circuit 304. In some embodiments, temperature sensors may be placed at various locations to obtain a temperature reading within housing 108, a temperature of housing 108, and a temperature of various internal components such as the rotor, stator, permanent magnets, and coils or stator windings. The temperature(s) 316 provided to the motor controller circuit 304 may be used in connection with determining an operating speed or rate of the motor 104. For example, if the temperature 316 indicates that a temperature of the motor 104 or a temperature of a component of the motor and control system 100 is at or above a known or predetermined threshold or set point, the motor controller circuit 304 may take appropriate action to prevent the motor 104 and/or the motor and control system 100 and/or the variable frequency drive control system 300, including the various components therein, from overheating and thereby minimize the risk of a catastrophic failure. Such appropriate action may include, but is not limited to, reducing the speed at which the motor 104 operates, adjusting a speed to increase an efficiency of operation, and completely interrupting all power provided to the three phase bridge driver circuit 308 using a kill signal transmitted over a line 344—effectively shutting down the motor 104. Likewise, predetermined thresholds, or set points, and an appropriate action may be associated with system the operating profile 352. Alternatively, or in addition, appropriate action may also include sending an alert message, such as a text message, to a motor and control system 100 operator.

In some embodiments, and consistent with the present disclosure, the operation of motor control circuit 304 in conjunction with the temperature 316, allow all components of the variable frequency drive control system 300 to reside and/or be disposed within the motor housing/enclosure 108. Working together, the temperature 316 and the motor control circuit 304 maintain an internal temperature of motor 104 and/or motor housing/enclosure 108 such that the rated operating temperature of all components within the variable frequency drive control system 300 are not exceeded and all circuits, modules, controllers, and or components remain unexposed to the external operating environment. The motor controller circuit 304 may take appropriate action to maintain such a temperature by altering a voltage, a current, a power, a torque, a speed at which the motor 104 operates, and or by adjusting an efficiency of the motor operation.

A current measurement or indication 320 may be provided or transmitted to the motor controller circuit 304; the current 320 may provide an indication of one or more current measurements relating to the motor and control system 100. One or more of the sensors 356 may be a current sensor. For example, the current 320 may comprise a single current measurement indicative of an overall current consumption of the motor 104 or the motor and control system 100. Alternatively, or in addition, the current 320 may comprise a current measurement for each individual drive line provided to the motor 104. Alternatively, or in addition, the current 320 may comprise a current measurement associated with the stator of the motor 104; that is, the current 320 may be a measurement corresponding to a current flowing to and or from one or more stators. The current 320 may be provided by current sensors or ammeters, or may be provided directly from components within the variable frequency drive control system 300. Alternatively, or in addition, the current 320 may be an estimated current 320 based on the operation of the motor 104. Additionally the motor controller circuit 304 may sum the current measurement for each individual drive line and compare this sum total to a single current measurement indicative of an overall current consumption; any differences may indicate a fault condition and cause the motor controller circuit 304 to take an appropriate action to prevent damage to the motor and control system 100. Likewise, predetermined thresholds, or set points, and an appropriate action may be associated with the system operating profile 352.

For example, a sudden and rapid increase in motor loading may occur resulting in an increased supplied current to motor 104. The motor controller circuit 304 may receive an indication indicating that the current 320 is above a threshold, such as 150% over the normal operating current. Immediately, or after a specified period of time, the motor controller circuit 304 may take appropriate action to prevent damage to the motor and control system 100. Such action may include shutting down motor 104 or altering a voltage, a current, a power, a torque, a speed at which the motor 104 operates, and or by adjusting an efficiency of the motor operation.

A voltage measurement or indication 324 may be provided or transmitted to the motor controller circuit 304. Similar to the current 320; the voltage 324 may provide an indication of one or more voltage measurements relating to the motor and control system 100. For example, the voltage 324 may comprise a single voltage measurement indicative of a source voltage, such as a source voltage provided by a power source 332, or the voltage 324 may be sensed and provide an indication or measurement of voltages for the drive lines 340 and/or 348 and/or at various other points and at various times throughout the control circuit. The voltage 324 may be provided by voltage sensors or voltmeters, or may be provided directly from components within the variable frequency drive control system 300. One or more of the sensors 356 may be a voltage sensor. Any departures from an expected voltage may be indicative of a fault within the motor and control system 100 or power source 332, causing the motor controller circuit 304 to take appropriate an action to prevent damage to the motor and control system 100. Such action may include shutting down motor 104 or by altering a voltage, a current, a power, a torque, a speed at which the motor 104 operates, and or by adjusting an efficiency of the motor operation. Likewise, predetermined thresholds, or set points, and an appropriate action may be associated with the system operating profile 352.

An RPM 328 may provide or transmit an indication of the current operating rpm or speed of the motor 104. The RPM 328 may be provided or transmitted directly from the motor 104 utilizing an rpm sensor. In other embodiments, the rpm 328 may be a signal corresponding to an rpm and require further processing once received at the motor controller circuit 304. Alternatively, or in addition, the rpm 328 may be provided as an expected or calculated rpm; that is, the rpm 328 may be provided to the motor controller circuit 304 from the three-phase bridge driver circuit 308 as an indication of an expected rpm from the motor 104. Similarly, the rpm 328 may represent an rpm calculated by the motor controller circuit 304 as part of a speed control algorithm. Alternatively, or in addition, one or more of the sensors 356 may comprise an RMP sensor capable of providing an RPM. Any departures from an expected and actual rpm may be indicative of a fault within the motor and control system 100, causing the motor controller circuit 304 to take an appropriate action to prevent damage to the motor and control system 100. Such action may include shutting down motor 104 or by altering a voltage, a current, a power, a torque, a speed at which the motor 104 operates, and or by adjusting an efficiency of the motor operation.

In some embodiments, and consistent with the present disclosure, the motor controller circuit 304 may provide one or more signaling lines 340 to a bridge driver circuit, such as the three-phase bridge driver circuit and the inverter 308.

FIG. 3 depicts a brushless dc motor 104 requiring three separate phases u, v, and w; therefore, the motor controller circuit 304 has been depicted as supplying a three-phase bridge driver circuit and an inverter 308 with at least three separately phased signaling lines 340. Each phase provided by the motor controller circuit 304 may be provided as a pulse width modulated signal having a high and low component. The pulse width modulated signal provided by the motor controller circuit 304 may correspond to an amplitude and/or duration of a voltage or current applied to the motor 100 via the three-phase bridge driver circuit and the inverter 308. The three-phase bridge driver circuit and inverter 308 converts the pulse width modulated signals for each phase provided by the motor controller circuit 304 into a waveform of appropriate amplitude and duration to be applied to the motor 104 via drive lines 348.

The pulse width modulated signal provided by the motor controller circuit 304 may be transmitted to the motor 104 via the three-phase bridge driver circuit and inverter 308 and may correspond to a desired rpm, speed, flow, or rate as indicated by the Hall Effect switch 124. In a desired operation, the Hall Effect switch 124 is adjusted such that an indicator 128 reflects a desired rpm, speed, flow, or rate. The Hall Effect switch 124 then provides an output signal indicative of the Hall Effect switch's 124 position 312. The switch position 312 or the Hall Effect sensor 144 output signal, is provided to the motor controller circuit 304. The motor controller circuit 312 converts the switch position 312 or the Hall Effect sensor 144 output signal into an rpm, rate, flow, or speed value. Utilizing various modules and circuits within the motor controller circuit 304, a three-phased pulse width modulated signal is provided to the three-phase driver circuit and inverter 308 where the signal is transformed into a three phase signal, having phases u, v, and w, each with a desired amplitude and duration. Alternatively, or in addition, the motor controller circuit 304 may incrementally increase or decrease the speed, flow, rate, or rpm of the motor 104 until a desired speed, flow, rate, or rpm is achieved.

The pulse width modulated signal provided by the motor controller circuit 304 may be transmitted to the motor 104 via the three-phase bridge driver circuit and inverter 308 and may correspond to a desired rpm, speed, flow, or rate as provided by the remote interface 336. The remote interface 336 may provide an output signal(s) indicative of the desired rpm, speed, flow, or rate provided from a user to the motor controller circuit 304. Utilizing various modules and circuits within the motor controller circuit 304, a three-phased pulse width modulated signal is provided to the three-phase driver circuit and inverter 308 where the signal is transformed into a three phase signal, having phases u, v, and w, each with a desired amplitude and duration. Alternatively, or in addition, the motor controller circuit 304 may incrementally increase or decrease the speed, flow, rate, or rpm of the motor 104 until a desired speed, flow, rate, or rpm is achieved.

In another embodiment, and consistent with the present disclosure, the motor controller circuit 304 may adjust operating parameters of the motor and control system 100 to alter the amount of voltage and/or the amount of current applied to motor 104 to realize an "intelligent torque control" functionality. As the motor controller circuit 304 receives feedback, or indications, relating to the operation of motor and control system 100 such as, a current 320, a voltage 324, and an RPM 328, the motor controller circuit 304 may cause an altered voltage, current, or signal to be provided to motor 104 to achieve a desired motor operation. For example, as the motor 104 slows down in operation, the torque provided by the motor 104 may be increased, for example doubled. As previously discussed, a motor controller circuit 304 may be configured to operate within a specific operating profile and/or according to specific operating parameters. For example, motor controller circuit 304 may be configured to operate such that the current provided by power source 332 does not exceed a threshold. In such instances, as the feedback or indications pertaining to the amount of current consumed by the motor and control system 100 approaches such a threshold, motor controller circuit 304 may determine that the speed at which the motor 104 operates should be reduced. In response to this determination, motor controller circuit 304 may cause the motor 104 to respond accordingly, for example, reducing the motor 104 RPMs.

Alternatively, or in addition, the motor controller circuit 304 may determine that the operation of motor 104 may require additional torque when operating at a specific RPM and/or that the motor 104 is capable of providing additional torque when operating at a specific RMP. For example, in instances where the motor 104 may be connected with a transfer pump pumping a viscous fluid, as the pump encounters an increasing back pressure, additional torque can be provided by motor 104. The additional provided torque allows the transfer pump to achieve a higher operational pressure at a specific RPM. Motor controller circuit 304 may determine that additional torque can be provided. Such a determination may be based on one or more of a current consumption measurement, a voltage measurement, and an RPM measurement. For example, if motor controller circuit 304 receives feedback indicating that at a current operating speed, or RPM, the motor 104 is consuming a specific amount of current, voltage, and/or power that is below a threshold, the motor controller circuit 304 may cause or alter the current and/or voltage provided to motor 104. For example, the current provided to motor 104 can be increased resulting in an increased torque provided by motor 104. The net result of the Intelligent Torque Control feature will allow the pump to run at a high RPM at low back pressure and to provide a high flow rate. As the back pressure increases, the motor controller circuit 304 will slow down.

In another embodiment and consistent with the present disclosure, the motor controller circuit 304 may adjust operating parameters of the motor and control system 104 to alter the amount of voltage and/or the amount of current applied to the motor 104 in order to realize a "soft start" functionality. When connected to a transfer pump, implementing a "soft start" procedure may help to reduce pressure surges at startup. Additionally, other operating parameters may be adjusted by the motor controller circuit 304 to achieve a desired torque and/or efficiency at specified rpm, rate, flow, or speed; these operating parameters may include, but are not limited to, efficiency factor, torque, and current draw. Additionally, the "soft start" functionality may be realized as a function of the switch position 312 provided by the Hall Effect switch 124. For example, upon initial startup, the Hall Effect switch 124 may provide a signal indicating the switch position to the motor controller circuit 304; such signal may specify that a user desires a low rpm, flow, rate, or speed. In such an instance, a lower torque may be provided temporarily or permanently for the specified switch position. In other embodiments, the lower torque provided may be temporary in that the lower torque is provided at startup or within a specified amount of time from last use, and for a specified or limited duration.

Alternatively, or in addition, the motor controller circuit 304 may adjust operating parameters of the motor and control system 104 to alter the amount of voltage and/or the amount of current applied to motor 104 in order to provide an increased, or high, startup torque. For example, a high startup torque may be desired; upon initial startup, the Hall Effect switch 124 may provide a signal indicating the switch position to the motor controller circuit 304; such signal may specify that a user desires a high rpm, flow, rate, or speed. Alternatively, or in addition, when a high startup torque may be desired, upon initial startup, the remote interface 336 may provide a signal indicating that a user desires a high rpm, flow, rate, or speed. In such an instance, an increased, or high, torque may be provided temporarily or permanently for the specified switch position and/or signal received from the remote interface 336. In other embodiments, the higher torque provided may be temporary in that the higher torque is provided at startup or within a specified amount of time from last use, and for a specified or limited duration. In instances where a high startup torque is desired, the high torque is provided without requiring an excessive demand of power from the power source, such as a power outlet.

The remote interface 336 may provide necessary communication functionality to allow a user to remotely access information associated with the motor and control system 100. The remote interface 336 may also provide an interface for a user to remotely control the motor controller circuit 304 or modify specific operating parameters. Further, system operating profiles may be selected or chosen utilizing remote interface 336. For example, a user may alter the current, voltage, power, torque output of the motor and control system 100 via the remote interface 336. The remote interface 336 may be accessed using any wired or wireless means of communication. For example, a user may be able to communicate with the remote interface 336 utilizing WiFi, short message system (SMS), email, NFC, RF, optical, Bluetooth, infrared, RS232, RS485, RS422, USB, Ethernet, fiber optic, or the like.

Referring now to FIG. 5, details of a motor-pump-communication system 500 are depicted in accordance with at least some embodiments of the present disclosure. The motor-pump-communication system 500 may include the motor and control system 100, a pump, such as the transfer pump 504, a communication device 512, and a communication network 516. As previously discussed, the motor and control system 100 may be physically connected to a transfer pump 504. That is, a user 508 may cause the transfer pump 504 to pump a liquid and/or gas. The rate at which the transfer pump 504 operates may be controlled or based on an operating parameter, such as speed and/or torque, provided by the motor and control system 100.

As previously discussed, a user 508 may access information associated with the motor and control system utilizing a remote interface 336. In some embodiments, the remote interface 336 may entirely or partially reside within the motor housing 108. For example, all or part of a communication antenna may reside external to the motor enclosure 108 while the control portion may reside within the motor housing 108. Additionally, a communication device 512 utilized by the user 508 may communicate with the remote interface 336 via the communication network 516.

In accordance with at least some embodiments of the present disclosure, a communication device 512A-D may comprise any type of known communication device or collection of communication equipment. Examples of a suitable communication devices 512A-D may include, but are not limited to, a personal computer 512B or laptop, a cellular phone, a smartphone 512D, a telephone, a tablet, an enterprise telecommunication device 512C, a telephony application residing on the one or more previously listed devices, a browser or "app" residing on the one or more previously listed devices, or other communication device 512A which can make or receive communications. In general, each communication device 512A-D may provide many capabilities to a user 508. These capabilities may include, but are not limited to, video, audio, text, applications, and/or data communications required to access the remote interface 336. The type of medium used by the communication device 512A-D to communicate with the remote interface 336 may depend upon the communication applications available on the communication endpoint 512A-D.

As previously discussed, the communication device 512A-D may communicate with the motor and control system 100 utilizing the communication network 516. The communication network 516 may be packet-switched and/or circuit-switched. An illustrative communication network 516 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. The Internet is an example of the communication network 516 that constitutes an Internet Protocol (IP) network including many computers, computing networks, and other communication devices located all over the world, which are connected through many communication systems and other means. In one configuration, the communication network 516 is a public network supporting the TCP/IP suite of protocols. Communications supported by the communication network 516 include real-time, near-real-time, and non-real-time communications. For instance, the communication network 516 may support voice, video, text, web-conferencing, or any combination of media and may facilitate one or more signaling protocols to setup, maintain, and/or teardown a communication session, communication thread, communication flow and the like. Moreover, the communication network 516 may comprise a number of different communication media such as coaxial cable, copper cable/wire, fiber-optic cable, antennas for transmitting/receiving wireless messages, and combinations thereof. In addition, it can be appreciated that the communication network 516 need not be limited to any one network type, and instead may be comprised of a number of different networks and/or network types.

For illustrative purposes, a user 508 who desires to view the operation/status of the motor and controller 100 may utilize a communication device 512A-D to view such information provided from the motor and controller 100 via the communication network 516. It should be appreciated that the communication network 516 may be distributed. Although embodiments of the present disclosure will refer to one communication network 516, it should be appreciated that the embodiments claimed herein are not so limited. For instance, multiple communication networks 516 may be joined by many servers and networks.

In accordance with some embodiments of the present disclosure, a user 508 desiring to view operation and/or status information associated with the motor and controller 100 may access information stored directly at the motor and controller 100 and/or may access information stored at one or more servers connected to the communication network 516. As one example, data associated with one or more operating parameters corresponding to the operation of the motor and controller 100 may be stored and/or otherwise logged within a database 524 of one or more servers 520. That is, the database 524 may record information corresponding to motor and controller 100 operation over time such that a history of the motor and controller 100 operation is accessible. For example, a speed at which motor 104 operations, a temperature sensed by one or more temperatures sensors, a torque, and/or the voltage and current supplied to and/or consumed by the motor 104 may be logged in a database 524. Although illustrated as being connected and/or otherwise associated with one or more servers 520, the database 524 may reside within the motor housing 108 and be part of the remote interface 336 and/or the variable frequency drive control system 300.

In some embodiments, and consistent with the present disclosure, the user 508 may make changes to a system profile or otherwise alter the operation of the motor and controller 100 utilizing a communication device 512. That is, utilizing the remote interface 336, a communication network 516, and/or one or more servers 520, the user 508 may access and change a speed at which the motor 104 operates, a torque provided by the motor 104, current and voltage settings, and/or one or more temperatures in which the motor and controller 100 are to operate below. That is, the system operating profile 352 and/or one or more setpoints may be modified remotely.

In some embodiments, the system operating profile 352 may reside at one or more servers 520 such that the motor and controller 100 accesses the profile 352 via the remote interface 336 and the communication network 516. Accordingly, a user 508, utilizing one or more communication devices 512A-D, may change a system operating profile stored at the one or more servers 520. In such an instance, the change may be automatically communicated or pushed to the motor and controller 100; alternatively, or in addition, the motor and controller 100 may poll the server 520 according to a predetermined schedule, timing, and/or event.

FIG. 6 illustrates a block diagram depicting one or more components included in a communication device 512A-D, variable frequency drive control system 300, motor controller circuit 304, and/or a server 520 in accordance with at least some embodiments of the present disclosure. In some embodiments, the communication device 512A-D, variable frequency drive control system 300, motor controller circuit 304, and/or a server 520 may include a processor/controller 604 capable of executing program instructions. The processor/controller 604 may include any general purpose programmable processor or controller for executing application programming. Alternatively, or in addition, the processor/controller 604 may comprise an application specific integrated circuit (ASIC). The processor/controller 604 generally functions to execute programming code that implements various functions performed by the associated server or device.

The communication device 512A-D, variable frequency drive control system 300, motor controller circuit 304, and/or a server 520 may additionally include memory 608. The memory 608 may be used in connection with the execution of programming instructions by the processor/controller 604, and for the temporary or long term storage of data and/or program instructions. For example, the processor/controller 604, in conjunction with the memory 608, may implement applications, programs, and/or web services.

The memory 608 of the communication device 512A-D, variable frequency drive control system 300, motor controller circuit 304, and/or a server 520 may comprise solid state memory that is resident, removable and/or remote in nature, such as DRAM and SDRAM. Moreover, the memory 608 may comprise a plurality of discrete components of different types and/or a plurality of logical partitions. In accordance with still other embodiments, the memory 608 comprises a non-transitory computer readable storage medium. Such a medium may take many forms, including but not limited to, non-volatile media, volatile media, and transmission media.

The communication device 512A-D, variable frequency drive control system 300, motor controller circuit 304, and/or a server 520 may further include a communication interface 612, a user input 620, a user output 624, and/or a user interface 628. One or more components of the communication device 512A-D, variable frequency drive control system 300, motor controller circuit 304, and/or a server 520 may communicate with another utilizing a communications bus 616. The communication interface 612 may comprise a GSM, CDMA, FDMA, and/or analog cellular telephony transceiver capable of supporting voice, multimedia and/or data transfers over a cellular or local network. Alternatively, or in addition, the communication interface 612 may comprise a Wi-Fi, BLUETOOTH™, WiMax, infrared, NFC or other wireless communications link. The communication interface 612 may be associated with one or more shared or a dedicated antennas. The type of medium used by the communication device 512A-D, variable frequency drive control system 300, motor controller circuit 304, and/or a server 520 to communicate with other communication devices 512A-D, variable frequency drive control systems 300, motor controller circuits 304, and/or a server 520, may depend upon the communication applications availability on the communication device 512A-D, variable frequency drive control system 300, motor controller circuit 304, and/or a server 520 and/or the availability of the communication medium.

The communication device 512A-D, variable frequency drive control system 300, motor controller circuit 304, and/or a server 520 may optionally include a user interface 628 allowing a user 508 to interact with the communication device 512A-D, variable frequency drive control system 300, motor controller circuit 304, and/or a server 520. For example, the user 508 may be able to enter a contact address in a communication device 512, such as a web address or Uniform Resource Locator (URL), and communicate with one or more server 520 and/or one or more of the motor and controller 100. Moreover, the user 508 may interact with the user interface 628 to configure one or parameters of the motor and controller 100, operate or otherwise interact with one or more applications running on the variable frequency drive control system 300, motor controller circuit 304, and/or a server 520, and configure one or more system operating profiles 352. Examples of user input devices 620 include a keyboard, a numeric keypad, a touch screen, a microphone, scanner, and pointing device combined with a screen or other position encoder. Examples of user output devices 624 include a display, a touch screen display, a speaker, and a printer.

Referring now to FIG. 7, a method 700 of controlling the operation of a motor and controller 100 will be discussed in accordance with embodiments of the present disclosure. Method 700 is in embodiments, performed by a device, such as a motor controller circuit 304. More specifically, one or more hardware and software components may be involved in performing method 700. In one embodiment, one or more of the previously described modules and/or devices perform one or more of the steps of method 700. The method 700 may be executed as a set of computer-executable instructions executed by a motor and controller 100 encoded or stored on a computer-readable medium. Hereinafter, the method 700 shall be explained with reference to systems, components, modules, software, etc. described with FIGS. 1-6.

Method 700 may continuously flow in a loop, flow according to a timed event, or flow according to a change in an operating or status parameter. Method 700 may be performed by the variable frequency drive control system 300 and/or motor controller circuit 304. Method 700 is initiated at S704. Once the method 700 has been started, at S704 the position of the Hall Effect switch 124 is received. The position of the Hall Effect switch 124 may be received as a switch position 312. From step S708, method 700 proceeds to S712, where it is determined whether or not there has been a change in the switch position. A change in the switch position may be detected in response to a user changing or adjusting the Hall Effect switch 124 to achieve a desired motor rpm, method, rate, and/or speed. In one example, the Hall Effect switch 124 may indicate a change from an "off" position to an "on" position. In embodiments consistent with the present disclosure, the Hall Effect switch 124 may indicate a change from an on position to an off position. If a change in the position of the Hall Effect switch 124 has been detected, method proceeds to S716 where the speed, rpm, method, or rate of the motor is adjusted. In accordance with an embodiment of the present disclosure, the speed of the motor 104 may be adjusted utilizing motor controller circuit 304 as previously described.

If the switch position has not changed or the speed of the motor has been adjusted, method 700 then proceeds to S720 where system feedback is obtained. System feedback may correspond to readings from various sensors or indicators, such as temperature, rpm, current, and voltage that are used to obtain an indication of the operation of motor 104 and the motor and control system 100. System feedback may correspond to a temperature reading of various components of the system 100, a current reading, a voltage reading, and/or an rpm reading. Such indicators may be provided by sensors specifically designed to measure temperature, current, voltage, and/or rpm, or the indicators may be provided by various components of the variable frequency control system 300, such as the three-phase driver and inverter 308.

After system feedback has been obtained, method 700 then proceeds to S724 where the feedback is compared to a reading of the switch position. That is, in one example, the feedback may indicate that the motor is below or above a desired operation as indicated by the switch position. Accordingly, if the feedback is not indicative of the switch position, that is the switch position does not match the current operation of the motor 104, method 700 proceeds back to step S716 where the motor is once again adjusted. Alternatively, or in addition, if the feedback is indicative of the switch position, method 700 proceeds to step S728 where the method 700 ends. As mentioned previously, the method 700 may continuously method in a loop, method according to a timed event, or method according to change in an operation status.

Referring now to FIG. 8, a method 800 of controlling the operation of a motor and controller 100 will be discussed in accordance with embodiments of the present disclosure. Method 800 is in embodiments, performed by a device, such as a motor controller circuit 304. More specifically, one or more hardware and software components may be involved in performing method 800. In one embodiment, one or more of the previously described modules and/or devices perform one or more of the steps of method 800. The method 800 may be executed as a set of computer-executable instructions executed by a variable frequency drive control system 300, motor controller circuit 304, and/or server 520 encoded or stored on a computer-readable medium. Hereinafter, the method 800 shall be explained with reference to systems, components, modules, software, etc. described with FIGS. 1-7.

Method 800 may continuously flow in a loop, flow according to a timed event, or flow according to a change in an operating or status parameter. Method 800 is initiated at S804. Once the method 800 has been started at S804, the operating status/information of the motor and control system 100 is received at step S808. Such information may correspond to real-time operating conditions such as current, voltage, torque, and rpm of the motor and control system 100. Accordingly, the retrieved operating information may then be displayed on a user interface 628 via user output 624. For example, the retrieved operating information may be displayed on a user interface 628 belonging to a display, or screen, of a communication device 512A-D. As one example, the information may be displayed via a web page or website. In some embodiments, the retrieved information may be displayed via a specially programmed application and/or app. From step S812, method 800 proceeds to step S816 where a change in operating parameters or setpoints may be indicated. For example, as previously discussed, a user 508 may desire to change an operating speed of motor 104. Accordingly, the user 508 may enter a new speed into a user interface 628 of a communication device 512A-D. If new operating parameters are received at step S816, method 800 proceeds to step S820 where the new operating parameters are communicated to the remote interface 336 of the variable frequency drive control system 100 of the motor and controller 100. As previously discussed, such parameters may be pushed from either a communication device 512A-D, server 520, or other provider of parameters. Alternatively, or in addition and as previously discussed, the parameters may be pulled from the motor and control system 100.

Accordingly, once the new parameters have been communicated, the method 800 proceeds to step S824 where the speed, rpm, flow, rate, and/or setpoint of the motor is adjusted. In accordance with an embodiment of the present disclosure, the speed of the motor 104 may be adjusted utilizing motor controller circuit 304 as previously described. The method 800 then proceeds to step S828 where system feedback back is obtained. System feedback may correspond to readings from various sensors or indicators, such as temperature, rpm, current, and voltage that are used to obtain an indication of the operation of motor 104 and the motor and control system 100. System feedback may correspond to a temperature reading of various components of the system 100, a current reading, a voltage reading, and/or an rpm reading. Such indicators may be provided by sensors specifically designed to measure temperature, current, voltage, and/or rpm, or the indicators may be provided by various components of the variable frequency drive control system 300, such as the three-phase driver and inverter 308.

After system feedback has been obtained, the method then proceeds to step S832 where the feedback is compared to the operating parameters received at step S816. That is, in one example, the feedback may indicate that the motor is below or above a desired operation as indicated by the desired operating parameters. Accordingly, if the feedback is not indicative of the desired operating parameters, that is the desired operating parameters do not match the current, or real-time, operation of the motor 104, the method 800 proceeds back to step S824 where the motor is once again adjusted. Alternatively, or in addition, if the feedback is indicative of the operating parameters, the method 800 proceeds to step S836 where the method 800 ends. As mentioned previously, the method 800 may continuously flow in a loop, flow according to a timed event, or flow according to change in an operation status. Alternatively, or in addition, at step S816, if no new parameters are received and/or no parameters are changed, the method 800 may proceed to step S828.

Referring now to FIG. 9, a method 900 of controlling the operation of a motor and controller 100 will be discussed in accordance with embodiments of the present disclosure. Method 900 is in embodiments, performed by a device, such as a motor controller circuit 304. More specifically, one or more hardware and software components may be involved in performing method 900. In one embodiment, one or more of the previously described modules and/or devices perform one or more of the steps of method 900. The method 900 may be executed as a set of computer-executable instructions executed by a variable frequency drive control system 300, motor controller circuit 304, and/or server 520 encoded or stored on a computer-readable medium. Hereinafter, the method 900 shall be explained with reference to systems, components, modules, software, etc. described with FIGS. 1-8.

Method 900 may continuously flow in a loop, flow according to a timed event, or flow according to a change in an operating or status parameter. Method 900 is initiated at S904. Once the method 900 has been started at S904, fault thresholds may be retrieved. Such fault thresholds may correspond to absolute thresholds, or bounds, of which the motor and controller 100 must operate within to avoid damaging one or more components. For example, the motor and controller 100 may provide one or more fault indications if one or more inputs 316, 320, 324, and 328 are determined to be above or below such fault thresholds. As one example, if the voltage and/or current utilized by the motor and controller 100 is more than a specified fault threshold, a fault may be declared and a the motor and controller 100 may take appropriate action to either reduce the fault or shutdown the motor until the fault is resolved. As another example, if the motor 104 is determined by the motor and controller 100 to have a temperature that exceeds a fault condition, a fault may be declared and the motor and controller 100 may take appropriate action to either reduce the temperature or shutdown the motor until the fault is resolved. Alternatively, or in addition, appropriate action may also include sending an alert message, such as a text message, email, or otherwise, to a motor and control system 100 user 508. Method 900 then proceeds to step S912 where system feedback is obtained. As previously discussed, system feedback may correspond to readings from various sensors or indicators, such as temperature, rpm, current, and voltage that are used to obtain an indication of the operation of motor 104 and the motor and control system 100. System feedback may correspond to a temperature reading of various components of the system 100, a current reading, a voltage reading, and/or an rpm reading. Such indicators may be provided by sensors specifically designed to measure temperature, current, voltage, and/or rpm, or the indicators may be provided by various components of the variable frequency drive control system 300, such as the three-phase driver and inverter 308.

Once the system feedback has been obtained, the method 900 proceeds to steps S916 where the system feedback is compared against fault thresholds to detect operating faults requiring remediation. The method then passes to S920 where if a fault has been detected at S920, appropriate action is taken at S932. For example, if the current reading on one of the three-phase lines, u for instance, indicates that the current on line u is above a threshold, the motor controller circuit 304 may shutdown the motor 104. As another example, a temperature reading provided by a temperature indicator 316 may indicate that the temperature of a specific winding is above a threshold, for example 150 degrees Celsius. In response to the temperature of the winding, the motor controller circuit 304 may slow down the motor 104 to reduce the temperature of the winding. Alternatively, or in addition, the motor 104 may be shut down completely to avoid a catastrophic failure. Alternatively, or in addition, appropriate action may also include sending an alert message, such as a text message, email, or otherwise, to a motor and control system 100 user 508. After taking the appropriate action to correct or minimize a detected fault, the method then proceeds to step S936 where the method ends. As mentioned previously, the method 900 may continuously flow in a loop, flow according to a timed event, or flow according to change in an operation status.

If a fault is not detected at step S920, the method proceeds to step S924 where the feedback obtained for the system at S912 is compared against a system operating profile. In an embodiment consistent with the present disclosure, a system operating profile may correspond to a set of operating set-points, thresholds, or operating parameters in which the motor and control system 100 is to operate within. A system operating profile may be dependent on the intended operation of the motor 104. For example, the motor 104 may be connected to a transfer pump transferring a liquid of a specified viscosity. Alternatively, or in addition, a system operating profile may depend on an operating environment. For example, as discussed above, a temperature set point or threshold may correspond to a flashpoint of a specific combustible chemical. For instance, the motor 104 may be connected to a transfer pump (not shown) and be operating in an environment containing combustible gases or vapors having a low flashpoint. A system operating profile may specify that the temperature of a component or housing, as indicated by temperature 316, is not to rise above a certain level corresponding to the flashpoint of the combustible gases or vapors. For example, a gas or vapor may have a flashpoint of 110 degrees Celsius. The system operating profile may specify that a temperature of housing 108 is not to rise above 100 degrees Celsius. If the feedback obtained from S912 is greater than a threshold contained in a system operating profile, the method 900 may proceed to S928 where corrective action may be taken. If, on the other hand, the feedback obtained from S912 is not greater than a threshold and thus no system operating profile issue or fault is detected, the method may end at S936. As mentioned previously, the method 900 may continuously flow in a loop, flow according to a timed event, or flow according to change in an operation status.

For example, if the temperature of a housing 108 rises above 55 degrees Celsius, the motor controller circuit 304 may act to reduce the temperature of housing 108 by reducing the speed at which the motor 104 operates. If, in a next cycle, the temperature of the housing 108 rises above 65 degrees Celsius, the motor controller circuit 304 may determine that the motor 104 should be completely shut down.

As another example, if the temperature of a motor winding rises above 130 degrees Celsius, the motor controller circuit 304 may determine that the speed of the motor 104 should be reduced. If the temperature of a winding in motor 104 continues to rise or is still above 130 degrees Celsius after a duration of time, the motor controller circuit 304 may determine that the motor 104 should be completely shut down.

As another example, if the temperature of a power module or the temperature of the three phase bridge driver circuit 308 rises above 95 degrees Celsius, the motor controller circuit 304 may act to reduce the temperature of the power module or the temperature of the three phase bridge driver circuit 308 by reducing the speed at which the motor 104 operates or by acting to alter or limit the voltage, phase, and/or current of lines u, v, w provided to the motor 104. If, in a next cycle, the temperature of the power module or the temperature of the three phase bridge driver circuit 308 rises above 105 degrees Celsius, the motor controller circuit 304 may determine that the motor 104 should be completely shut down.

According to embodiments of the present application, the motor and control system 100 may operate such that the motor runs at a cool operating temperature. That is, the variable frequency drive control system 300 may reside within the housing 108; accordingly, temperatures of various components and/or areas within the housing 108 cannot exceed the operating conditions recommended for operating the variable frequency drive control system 300. Stated another way, prior art variable frequency drive (VFD) systems are provided away from the motor because prolonged motor operation generally brings temperatures that exceed the operating conditions conducive to the VFD. Embodiments of the present disclosure effectively manage the temperature of various components within the housing 108, while maintaining torque and speed, such that a VFD can reside within the housing. That is, the VFD may reside in a cylindrical housing 108. Moreover, because the operating temperatures of the motor and control system 100 are conducive to placing a VFD within the housing 108, the housing 108 and/or other materials included within the motor and control system 100 may comprise materials that are lighter than metal as such materials may not be required to withstand high operating temperatures.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A motor and control system comprising:
a motor housing enclosing a rotor and stator including one or more windings;
a drive controller disposed within the motor housing, wherein the drive controller includes:
a motor control circuit including at least one system operating profile, and
a remote communication interface configured to wirelessly communicate with one or more servers using a communication network,
wherein,
the motor control circuit is configured to wirelessly access a selected system operating profile from a plurality of system operating profiles located at the one or more servers via the remote communication interface, wirelessly receive an operating parameter based on the selected system operating profile located at the one or more servers, update the system operating profile of the motor control circuit based on the wirelessly received operating parameter, compare an indication of operation received from a sensor to the wirelessly received operating parameter, and increase or decrease a rate at which the motor operates based on a comparison between the indication of operation received from the sensor and the wirelessly received operating parameter.

2. The motor and control system of claim 1, wherein the motor is an electric direct current brushless motor.

3. The motor and control system of claim 1, further comprising a server in communication with the remote communication interface, wherein the server stores a plurality of system operating profiles wherein a system operating profile may be selected by a user and the motor control circuit receives the selected system operating profile from the server via the remote communication interface.

* * * * *

UNITED STATES PATENT AND TRADEMARK OFFICE
CERTIFICATE OF CORRECTION

PATENT NO. : 9,825,561 B2  
APPLICATION NO. : 15/150420  
DATED : November 21, 2017  
INVENTOR(S) : Randy J. Dixon Page 1 of 1

It is certified that error appears in the above-identified patent and that said Letters Patent is hereby corrected as shown below:

In the Specification

In Column 22, Lines 9 and 10, delete "at 5704. Once the method 700 has been started, as 5704" and substitute therefor -- at S704. Once the method 700 has been started, as S704 --.

Signed and Sealed this  
Twenty-second Day of May, 2018

Andrei Iancu  
*Director of the United States Patent and Trademark Office*